(12) United States Patent
Kasper

(10) Patent No.: US 10,596,725 B2
(45) Date of Patent: Mar. 24, 2020

(54) WET TABLE SAW CONTAINMENT SYSTEM

(71) Applicant: Tommy Jay Kasper, Elgin, TX (US)

(72) Inventor: Tommy Jay Kasper, Elgin, TX (US)

( * ) Notice: Subject to any disclaimer, the term of this patent is extended or adjusted under 35 U.S.C. 154(b) by 0 days.

(21) Appl. No.: 16/372,660

(22) Filed: Apr. 2, 2019

(65) Prior Publication Data

US 2019/0299489 A1 Oct. 3, 2019

Related U.S. Application Data

(60) Provisional application No. 62/651,843, filed on Apr. 3, 2018.

(51) Int. Cl.
| | |
|---|---|
| *B28D 7/02* | (2006.01) |
| *B28D 1/04* | (2006.01) |
| *B23D 59/02* | (2006.01) |
| *B23D 59/00* | (2006.01) |
| *B23Q 11/08* | (2006.01) |

(52) U.S. Cl.
CPC ............ *B28D 7/02* (2013.01); *B23D 59/006* (2013.01); *B23D 59/02* (2013.01); *B23Q 11/0891* (2013.01); *B28D 1/04* (2013.01)

(58) Field of Classification Search
CPC .......... B28D 7/02; B23D 59/02; B23D 59/00; B23D 47/025; B23D 47/02; B23Q 11/0825; B23Q 11/0891
USPC ................................ 125/13.01; 451/453, 455
See application file for complete search history.

(56) References Cited

U.S. PATENT DOCUMENTS

| | | | | |
|---|---|---|---|---|
| 4,779,603 | A * | 10/1988 | Crocetti | B23D 59/02 125/13.01 |
| 4,976,251 | A | 12/1990 | Smith | |
| 5,797,488 | A | 8/1998 | Yemini | |
| 6,557,602 | B1 * | 5/2003 | Sorensen | B23D 47/025 144/286.1 |
| 6,796,890 | B1 | 9/2004 | Goldrick | |
| 7,766,728 | B2 | 8/2010 | Williamson et al. | |

(Continued)

FOREIGN PATENT DOCUMENTS

| | | |
|---|---|---|
| FR | 2770162 A1 | 4/1999 |
| WO | 1997004935 A1 | 2/1997 |

OTHER PUBLICATIONS

International Search Report and Written Opinion, Application No. PCT/US2019/025317, dated Jun. 14, 2019, 7 pages.

*Primary Examiner* — Robert A Rose

(74) *Attorney, Agent, or Firm* — Meyertons, Hood, Kivlin, Kowert & Goetzel, P.C.; Gareth M. Sampson; Jackie Pitre

(57) ABSTRACT

An apparatus for containing and collecting debris, dust, and/or fluid generated by a table saw is disclosed. The apparatus may include a pan and a frame for supporting the table saw during use. A plurality of trays may be attached to the pan. The trays may be extended from the pan to provide additional surface area for collecting debris, dust, and/or fluid generated by the saw. A hood apparatus may be coupled to the frame. The hood apparatus may include a fixed shield and an extendable shield for covering above the saw and containing debris, dust, and/or fluid from escaping the apparatus above the saw. A plurality of hanging curtains may be coupled to the fixed and extendable shields to prevent debris, dust, and/or fluid from escaping behind or to the side of the saw. Gravity drainage in the trays and pan may remove debris and dust from the fluid.

20 Claims, 6 Drawing Sheets

(56) References Cited

U.S. PATENT DOCUMENTS

| | | |
|---|---|---|
| 9,168,674 B2 | 10/2015 | Walker et al. |
| 2014/0261367 A1* | 9/2014 | Ipatenco ................ B28D 1/04 |
| | | 125/13.01 |

* cited by examiner

WET TABLE SAW CONTAINMENT SYSTEM

PRIORITY CLAIM

This application claims priority to U.S. Provisional Patent Application No. 62/651,843, filed on Apr. 3, 2018, all of which are hereby incorporated by reference in their entirety.

BACKGROUND OF THE INVENTION

1. Field of the Invention

Embodiments disclosed herein relate to a containment apparatus for a table saw. Certain embodiments disclosed herein relate to a portable containment apparatus for containing debris and liquid distributed by a wet table saw at a finished location for the material being cut by the saw.

2. Description of the Relevant Art

Currently, tiles (e.g., ceramic tiles) are typically cut outside of a finished location (e.g., location where tiles are installed) in order to prevent damage at the finished location and/or to avoid polluting the finished location with debris and/or dust from the cutting of tiles that has to be cleaned up. Such finished locations may include, but not be limited to, new constructions such as homes, office buildings, etc. When tiles are cut with a dry cut apparatus, there dust can pollute the environment and may be difficult to clean up. With current wet saws, when the blade cuts the tile there can be blowback from the blade thrown off that gets to the saw motor and/or escapes from the apparatus, polluting the environment. There are current systems that attempt to keep debris and/or liquid from polluting the environment. For example, there are systems having three shields and fixed obstructions. In such systems, however, the blowback can escape from the top. In addition, there is no way to accommodate for larger material (e.g., tile) to be cut. In some cases, wet saws can also make dust slurry that is not easily disposed of as the filter may only be designed to remove particles like dust. Yet another problem with current systems is that many of them utilize a substantial downward slanted slope to the drain to allow the slurry to enter the catch bucket and pump. The substantial downward slanted slope may, however, drain the slurry too quickly to allow proper pumping and/or filtration. Without proper filtration, a pump can become clogged or freeze up. Additionally, if fluid is reused in the system, the fluid may be a slurry of particles that can heat up saw blades, cause quick degradation of the saw blades, and/or clog the saw port holes resulting in system failure.

Thus, there is a need for an adaptable, and portable, containment system or apparatus for saws that can accommodate a variety of material sizes and that prevents blowback from the saw from escaping and/or getting to the saw motor. Providing such a system or apparatus may allow the saw to be used at a finished location by protecting unwanted pollution of the finished location. Such a system or apparatus may also keep a location of use of the saw clean and dry, thereby allowing an operator to operate the saw without standing in water or liquid, reducing the potential for electrical shock. Additionally, there is a need for an apparatus that provides cleaner reused fluid to increase saw operation efficiency and increase the lifetime of the saw blade.

SUMMARY OF THE INVENTION

In certain embodiments, an apparatus for supporting a saw includes a pan having at least four sides and a drain in a bottom of the pan. A frame may be positioned on the pan. A first tray may be coupled to a first side of the pan. The first tray may be capable of being moved in and out from the first side of the pan. A second tray may be coupled to a second side of the pan. The second tray may be capable of being moved in and out from the second side of the pan. A third tray may be coupled to a third side of the pan. The third tray may be capable of being moved in and out from the third side of the pan. A fourth tray may be coupled to a fourth side of the pan. The fourth tray may be capable of being moved in and out from the fourth side of the pan. At least one flat tray may be positioned on the frame. The at least one flat tray may be configured to support a saw. A hood apparatus may be coupled to the frame. The hood apparatus may be positioned at least partially above a position of the saw when the saw is placed on the at least one flat tray. The hood apparatus may include a hood arm brace attached to the frame, a hood frame attached to the hood arm brace, a fixed top shield coupled to the hood frame, a top shield extension coupled to the fixed top shield (where the top shield extension may be capable of being moved in and out from an end of the fixed top shield), and a plurality of curtains coupled to the fixed top shield and the top shield extension. The curtains may hang downwards from the fixed top shield and the top shield extension on at least three sides of the hood apparatus.

In certain embodiments, an apparatus for supporting a saw includes a pan having at least four sides and a drain in a bottom of the pan. A frame may be positioned on the pan. A first tray may be coupled to a first side of the pan. The first tray may be capable of being stored in the pan and extended from the first side of the pan. A second tray may be coupled to a second side of the pan. The second tray may be capable of being stored in the pan and extended from the second side of the pan. A third tray may be coupled to a third side of the pan. The third tray may be capable of being stored in the pan and extended from the third side of the pan. A fourth tray may be coupled to a fourth side of the pan. The fourth tray may be capable of being stored in the pan and extended from the fourth side of the pan. At least one flat tray may be positioned on the frame. The at least one flat tray may be configured to support a saw placed in the apparatus. A hood apparatus may be coupled to the frame. The hood apparatus may be positioned above a position of the saw when the saw is placed on the at least one flat tray. The hood apparatus may include a top shield, a top shield extension coupled to the top shield, and a plurality of curtains coupled to the top shield and the top shield extension. The top shield extension may be capable of being stored in the top shield and extended from an end of the top shield. The curtains may hang downwards from the top shield and the top shield extension on at least three sides of the position of the saw when the saw is placed on the at least one flat tray.

BRIEF DESCRIPTION OF THE DRAWINGS

Features and advantages of the methods and apparatus described herein will be more fully appreciated by reference to the following detailed description of presently preferred but nonetheless illustrative embodiments when taken in conjunction with the accompanying drawings in which.

Figure 1:
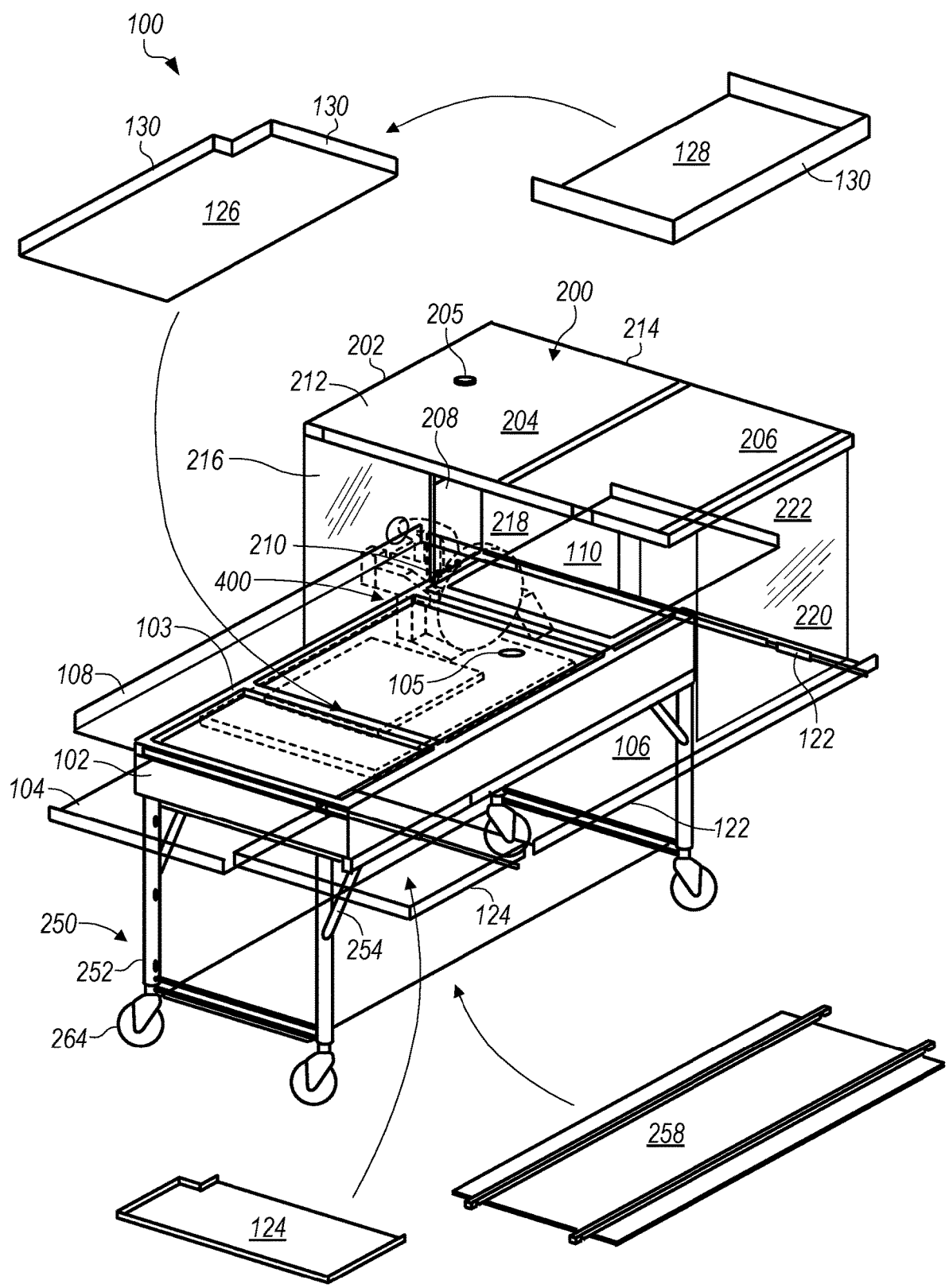
FIG. 1 depicts an upper front perspective view representation of an embodiment of a containment apparatus in an expanded position.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

The following examples are included to demonstrate preferred embodiments. It should be appreciated by those of skill in the art that the techniques disclosed in the examples which follow represent techniques discovered by the inventor to function well in the practice of the disclosed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosed embodiments.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Figure 2:
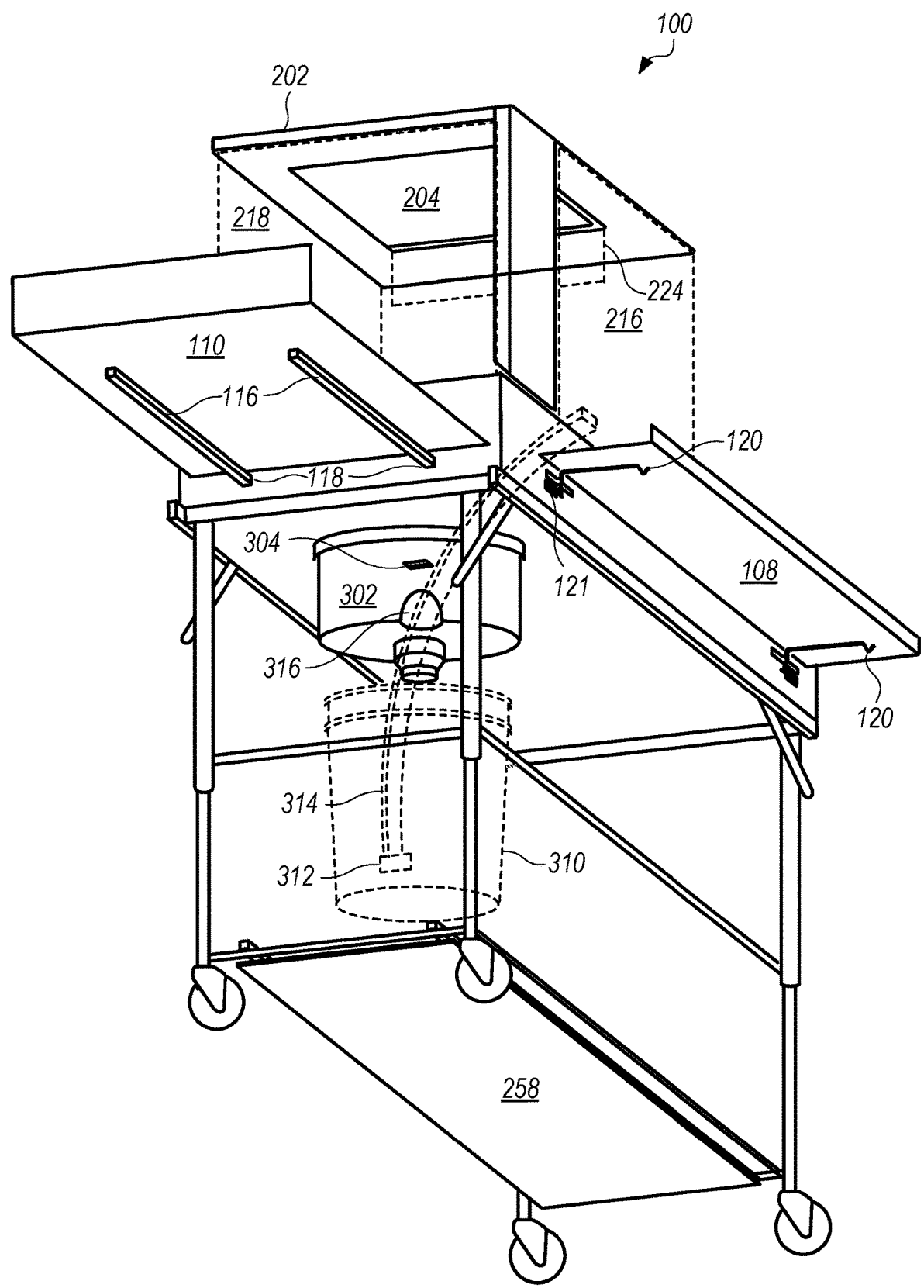
FIG. 2 depicts a lower rear perspective view representation of an embodiment of a containment apparatus.
Figure 3:
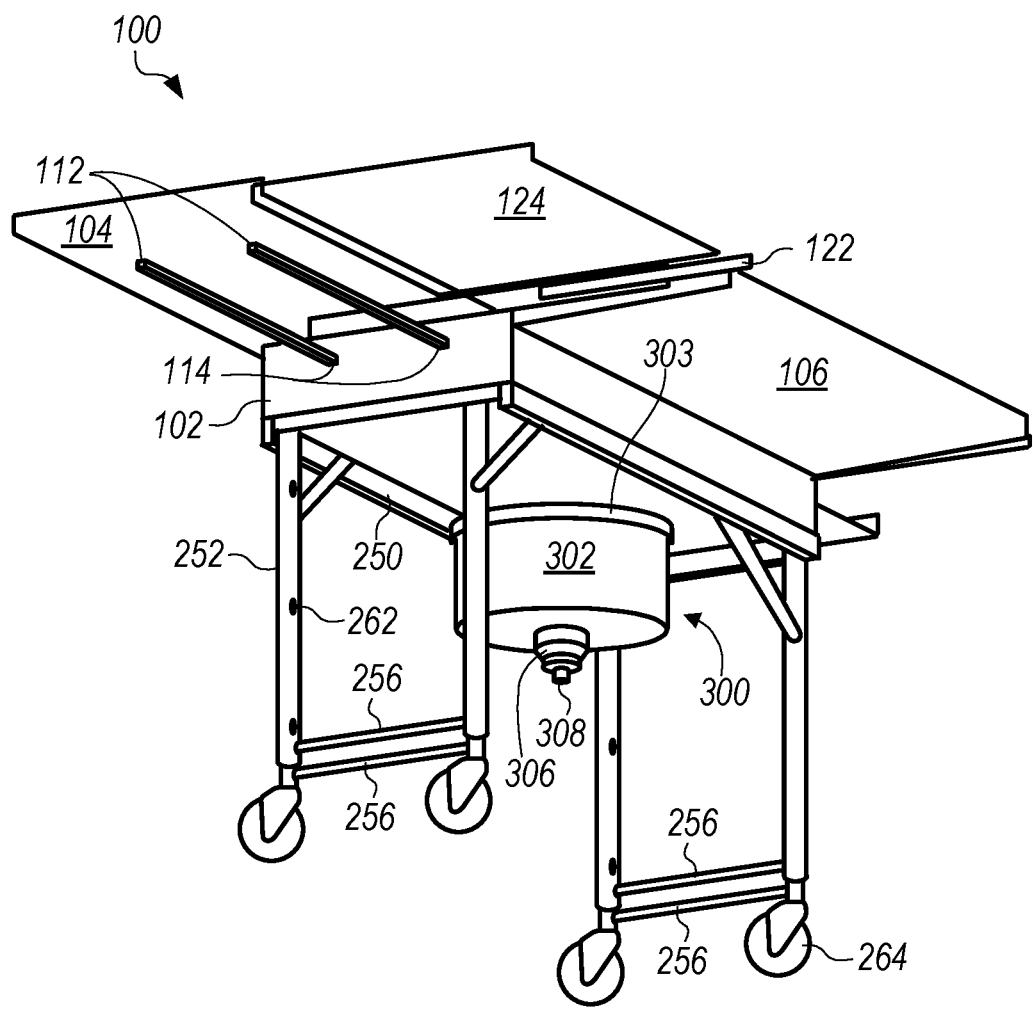
FIG. 3 depicts a lower front perspective view representation of an embodiment of a containment apparatus.
Figure 8:
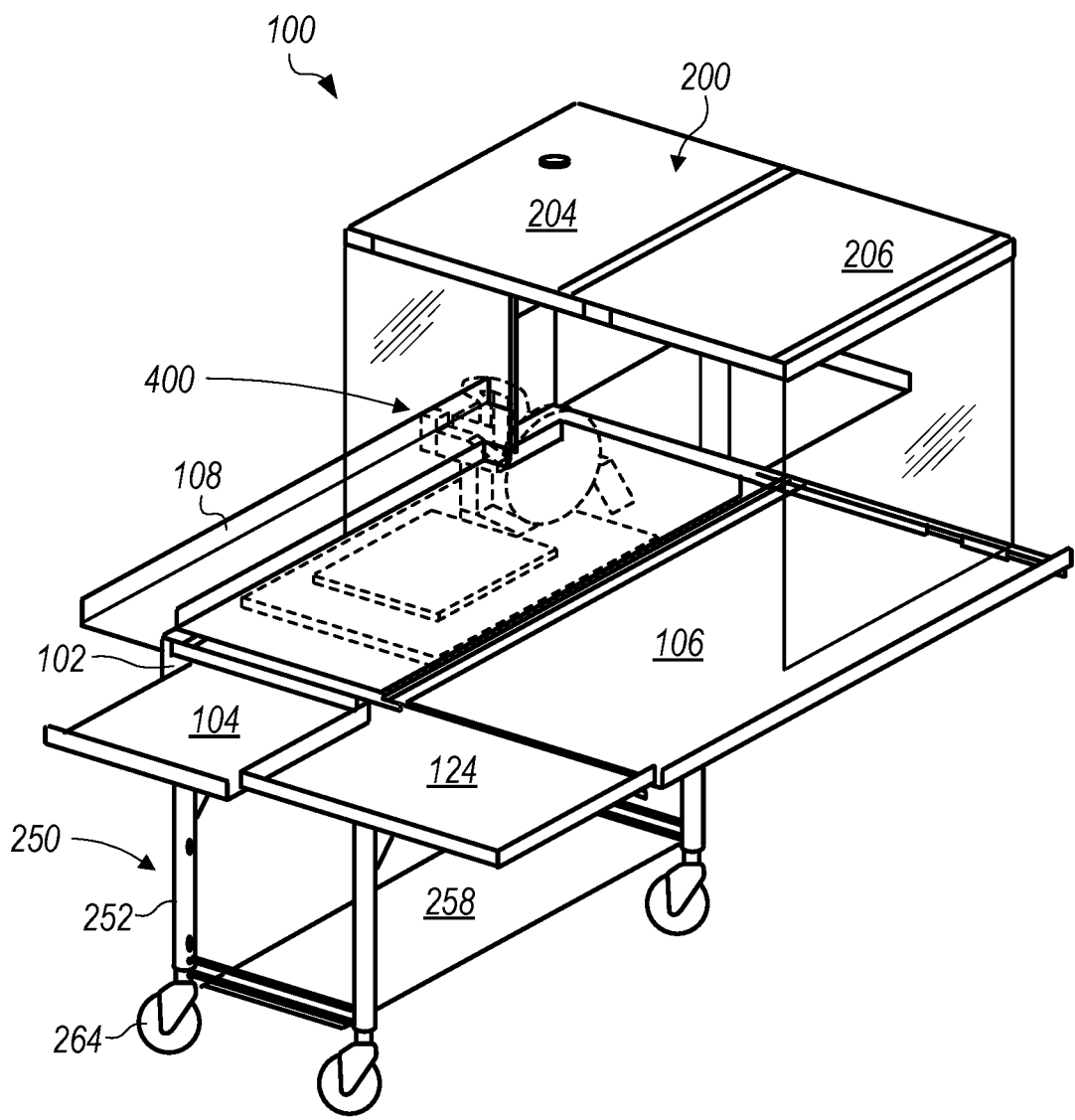
FIG. 8 depicts an upper front perspective view representation of an embodiment of a containment apparatus in an expanded position for use in operating a saw.

FIG. 1 depicts an upper front perspective view representation of an embodiment of containment apparatus 100 in an expanded position. FIG. 2 depicts a lower rear perspective view representation of an embodiment of containment apparatus 100. FIG. 3 depicts a lower front perspective view representation of an embodiment of containment apparatus 100. FIG. 1 depicts apparatus 100 expanded fully (e.g., trays 104, 106, 108, 110 are shown extended outward from pan 102 and hood components are also shown as extended) while FIGS. 2 and 3 depict only partial expansion of the apparatus (e.g., FIG. 2 shows only trays 108, 110 extended outward from pan 102 and FIG. 3 shows only trays 104, 106 extended outward from pan 102). It should be noted that some surfaces are shown as transparent in FIGS. 1, 2, and 3 so that hidden objects can be seen through the surfaces. FIG. 8 (described herein) depicts apparatus in an expanded position similar to FIG. 1 without transparent surfaces.

Figure 5:
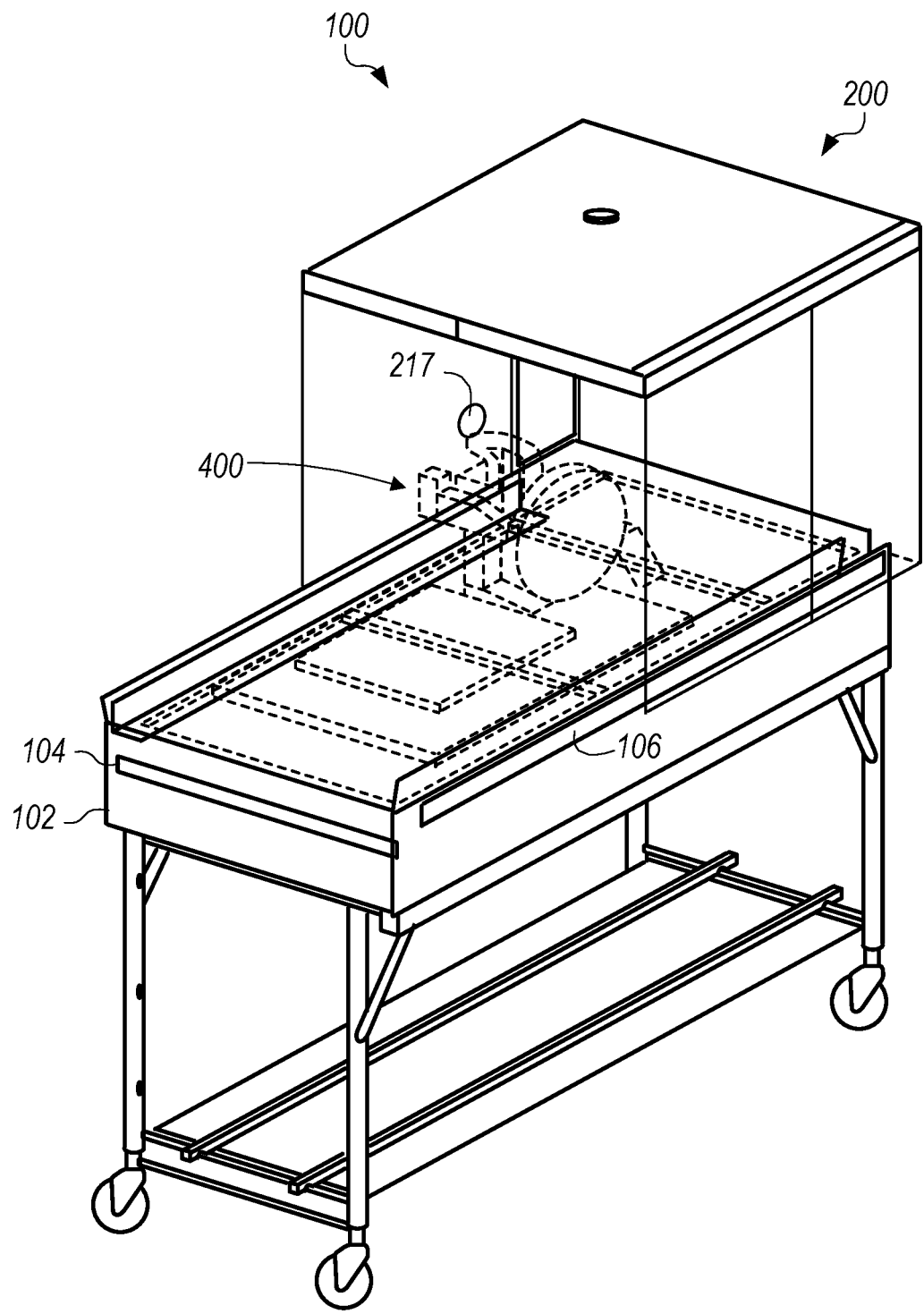
FIG. 5 depicts a front perspective view representation of an embodiment of a containment apparatus in a collapsed position.

FIG. 5 depicts a front perspective view representation of an embodiment of containment apparatus 100 in a collapsed position (e.g., a storage or transport mode). In FIG. 5, the trays and other expansion components are inserted into slots in pan 102, as described herein, for storage and/or transport of apparatus 100. The embodiment depicted in FIG. 1 (e.g., the "expanded position") may be used during operation of apparatus 100 (e.g., during cutting of tiles using a wet saw positioned in the apparatus).

Apparatus 100 may be used to contain debris and/or liquid that is produced by a saw (e.g., a wet saw) placed in the apparatus. In one embodiment, apparatus 100 is used to cut tile (e.g., ceramic tile) using a wet saw placed in the apparatus. Apparatus 100 may be used at a finished location for the tile (e.g., a location where the tile is installed). Thus, apparatus 100 may allow tile to be cut and installed at the same location.

In certain embodiments, apparatus 100 includes pan 102. Pan 102 may be referred to as a "gold pan" or another type of debris/fluid collection pan. Frame 103 may be positioned on top of or in pan 102. Pan 102 and/or frame 103 may be made of lightweight but strong materials such as, but not limited to, aluminum or rigid plastic. Frame 103 may be used to provide support for components and/or objects placed on top of pan 102 (e.g., trays and/or a saw as described herein). Pan 102 may include drain 105. In certain embodiments, drain 105 is a 2-inch hub. Drain 105 may be used to drain fluids from pan 102. In certain embodiments, the bottom of pan 102 includes a gentle slope from the sides of the pan towards drain 105. For example, the bottom of pan 102 may have a ⅛" per foot slope (e.g., ⅛" change in height for every foot of distance) towards drain 105. In some embodiments, corners and/or sides of pan 102 (e.g., sections near the edges of the pan) may have a larger slope. For example, the corners may have a ⅛" per inch slope within 2" of the corners of pan 102 (e.g., ¼" change in height over a distance of 2" from corners of the pan). In some instances, the sloping corners of pan 102 may allow apparatus 100 to be operated on an un-level surface as material will not become stuck in the corners when the pan is un-level.

In certain embodiments, trays 104, 106, 108, and 110 are coupled to pan 102. Trays 104, 106, 108, and 110 may be made of lightweight but strong materials such as, but not limited to, aluminum or rigid plastic. Tray 104 may be a front tray, tray 106 may be a right tray, tray 108 may be a left tray, and tray 110 may be a rear tray. Trays 104, 106, 108, and 110 may be coupled to the sides of pan 102 and moved in and out (e.g., extended in and out) from the sides of the pan to expand or compact apparatus 100. In one embodiment, trays 104, 106, 108, and/or 110 may be slid in and out of the slots in pan 102. For example, trays 104, 106, 108, and 110 may be slid into the slots (as shown in FIG. 3) to provide a compact apparatus 100. Trays 104, 106, 108, and 110 may be extended outwards from the sides of pan 102 (as shown in FIG. 1) to expand apparatus 100 and prepare the apparatus for use in containing debris and/or liquid while cutting materials with a saw or other machine placed in the apparatus. In certain embodiments, trays 104, 106, 108, and 110 are manually extended in and out from the sides of pan 102. Other embodiments may, however, also be contemplated where trays 104, 106, 108, and 110 are extended in and out from the sides of pan 102 using mechanical, pneumatical, or electrical means.

In certain embodiments, trays 104, 106, 108, and 110 have widths slightly smaller than the width of the side of pan 102 from which each tray extends from to allow the trays to fit into slots in the sides of the pan. The amount each of trays 104, 108, and 110 is extended may be varied based on the use of apparatus 100. For example, tray 106 may be extended different lengths based on the size of material (e.g., tile) being cut with a saw in apparatus 100.

In certain embodiments, apparatus 100 includes support members for trays 104, 106, 108, and 110. The support members may be used to support trays 104, 106, 108, and 110 when the trays are extended from pan 102. For example, tray 104 may be supported by supports 112, shown in FIG. 3. Supports 112 may be rods or other rigid support members that are extended in and out of pan 102 as needed to support tray 104. In some embodiments, supports 112 are inserted in holes 114 in pan 102 (shown in FIG. 1). In some embodiments, supports 112 include, or are coupled to, locking mechanisms that secure the supports when the supports are extended from pan 102 to inhibit the supports from inadvertently being pushed back into the pan. While two supports 112 are shown in FIG. 3, any number of supports may be contemplated.

Tray 110 may be supported by supports 116, shown in FIG. 2. Supports 116 may be rods or other rigid support members that are extended in and out of pan 102 as needed to support tray 110. In some embodiments, supports 116 are inserted in holes 118 in pan 102 (shown in FIG. 1). In some embodiments, supports 116 include, or are coupled to, locking mechanisms that secure the supports when the supports are extended from pan 102 to inhibit the supports from inadvertently being pushed back into the pan. While two supports 116 are shown in FIG. 2, any number of supports may be contemplated.

Tray 108 may be supported by supports 120, shown in FIG. 2. Supports 120 may be hinged arms (e.g., hinged swing arm rods). For example, supports 120 may be swing arm rods rotated along hinges into position to support tray 108 or folded against the side of pan 102 when not being used to provide support to the tray. In some embodiments, slide bolt 121 or another securing device may be used to hold supports 120 in place when extended from pan 102. Slide bolt 121 may be released to allow supports 120 to be lowered and rotated against the side of pan 102. While two supports 120 are shown in FIG. 2, any number of supports may be contemplated.

Tray 106 may be supported by supports 122, shown in FIGS. 1 and 3. In certain embodiments, supports 122 are slide supports (e.g., drawer slide supports). For example, supports 122 may be capable of being slid out from pan 102 to any desired length. Thus, the extension length of supports 122 may be adjusted based on the desired extension length of tray 106. While two supports 122 are shown in FIGS. 1 and 3, any number of supports may be contemplated.

In some embodiments, attachment plate 124 is coupled to pan 102 (shown both separate and coupled in FIG. 1). Attachment plate 124 may be coupled to pan 102 using a plate clip or other suitable coupling means. Attachment plate 124 may be coupled to pan 102 to mate with the surfaces of tray 104 and tray 106. Thus, attachment plate 124 may increase the area of the debris and/or liquid collection surface in combination with tray 104 and tray 106.

In certain embodiments, trays 104, 106, 108, and 110, when extended, have a slight slope downwards towards pan 102 (e.g., the trays slope downwards from the furthest edge of the trays towards the pan). In some embodiments, trays 104, 106, 108, and 110 may have a slope similar to the slope of pan 102, described above. In certain embodiments, trays 104, 106, 108, and 110 have a slope greater than the slope of pan 102. For example, trays 104, 106, 108, and 110 may have a ½" per foot slope (e.g., ½" change in height for every foot of distance) towards pan 102. The downward slope towards pan 102 in trays 104, 106, 108, and 110 may allow debris and/or fluid in the trays to drain towards the pan. The gentle slopes of trays 104, 106, 108, and 110 along with the gentle slope in pan 102 may allow fluid (e.g., slurry or liquid) to slowly drain towards drain 105. Slow draining of the fluid may allow separation of solids from the liquid (e.g., slow rolling separation of the slurry). Separating the solids from the liquid may allow the solids to remain in the trays and/or pan so that the liquid that enters drain 105 has less solids and is more easily handled by any downstream filter (described herein). Solids (debris) left in the trays may also be more easily disposed of than any solids or debris that enters the filter (e.g., by simply cleaning the solids from the tray after use).

In certain embodiments, apparatus 100 includes flat trays 126 and 128, shown in FIG. 1. Flat trays 126 and 128 are shown separate from the rest of apparatus 100 for clarity in FIG. 1. Flat trays 126 and 128 may be inserted into apparatus 100 on top of frame 103 as shown by the arrows in FIG. 1. Flat tray 126 may be placed on top of frame 103 of pan 102 and then flat tray 128 may be placed on top of flat tray 126. Flat tray 126 may include a notch in a corner of the tray to provide space for hood arm brace 208 (described below) when the flat tray is inserted in apparatus 100. When both flat tray 126 and flat tray 128 are placed on frame 103, the flat trays may include a combined three raised edges (shown as raised edges 130 in FIG. 1). Raised edges 130 may be on one or more edges of flat trays 126 and 128 (e.g., the left and rear edges of flat tray 126 and right, front, and rear edges of flat tray 128). Raised edges 130 may be shields that provide additional debris and/or fluid collection surfaces. The front side of the flat trays may not include a raised edge to allow the user to readily insert material into apparatus 100 and/or operate a saw placed in the apparatus. In certain embodiments, flat trays 126 and 128, when positioned on frame 103 have slightly smaller dimensions (e.g., length and/or width) than frame 103. Flat trays 126 and 128 may have slightly smaller dimensions to provide a gap between the edges of frame 103 and edges of the flat trays to allow debris and/or fluid to enter pan 102 on the edges of the flat trays (e.g., a gap for drainage between the edges of the frame and the edges of the flat trays). In some embodiments, flat tray 126 and/or flat tray 128 may include a cutout on a corner or edge of the flat tray to provide a gap or space for drainage into pan 102. In some embodiments, frame 103 and/or trays 126, 128 have slopes in their corners that match the slopes of the corners of pan 102. For example, frame 103 and/or trays 126, 128 may have a ¼" change in height over a distance of 2" from the corners of the frame and/or trays.

Figure 4:
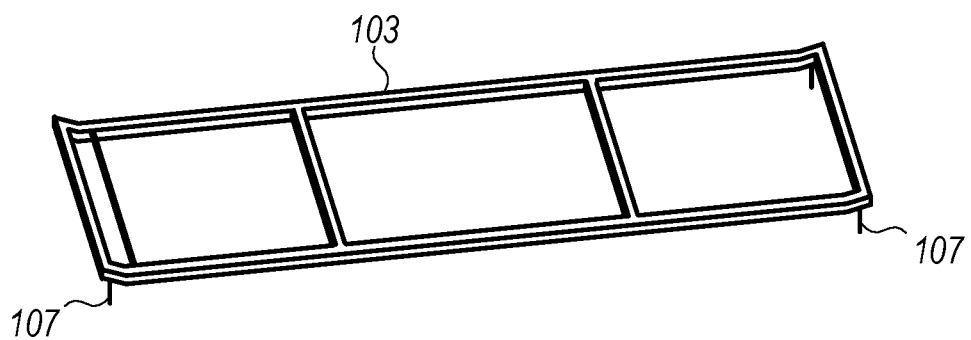
FIG. 4 depicts a perspective view representation of an embodiment of a frame.

FIG. 4 depicts a perspective view representation of an embodiment of frame 103 showing sloped corners on the frame. In some embodiments, frame 103 includes legs 107. Legs 107 may support frame 103 when placed on top of or in pan 102. Legs 107 may help keep frame 103 coupled to pan 102 when positioned on top of or in the pan.

In certain embodiments, apparatus 100 includes hood apparatus 200. Hood apparatus 200 may include hood frame 202, fixed top shield 204, and top shield extension 206. Hood frame 202, fixed top shield 204, and top shield extension 206 may be made of lightweight but strong materials such as, but not limited to, aluminum or rigid plastic. In one embodiment, hood frame 202 is made of aluminum and fixed top shield 204 and top shield extension 206 are made of rigid plastic. Frame 202 may be coupled to frame 103 on pan 102 using hood arm brace 208. Hood arm brace 208 may be coupled to frame 103 using, for example, bolts 210 or other fastening means. In certain embodiments, hood arm brace has a fixed height (e.g., the height of hood apparatus 200 above frame 103 is fixed). In some embodiments, hood arm brace 208 has an adjustable height. Hood arm brace 208 may be removed from frame 103 (along with other hood apparatus components) to allow apparatus 100 to be transported and/or moved through smaller spaces.

Fixed top shield 204 may be coupled to hood frame 202 and remain fixed above frame 103 and pan 102. In some embodiments, fixed top shield 204 includes hub 205. Hub 205 may be, for example, a 2" hub or port in the fixed top shield. Top shield extension 206 may be extended and retracted from hood frame 202 using slides 212 and 214. The extended length of top shield extension 206 may be varied as desired. For example, top shield extension 206 may be extended different lengths based on the size of material (e.g., tile) being cut with a saw in apparatus 100. In some embodiments, top shield extension 206 is extended the same length as tray 106. In some embodiments, top shield extension 206 is supported by a brace or other support placed between the top shield extension and tray 106.

In certain embodiments, hood apparatus 200 includes curtains to provide additional containment of debris, dust, and/or fluid. The curtains may be made of lightweight plastic or another semi-flexible material. Curtain 216 may hang from a rod or other attachment coupled to a left side of hood frame 202. Curtain 216 may hang along a left side of pan 102. Curtain 218 may hang from a backside of hood frame 202 and/or fixed top shield 204 (e.g., using a rod or other attachment). Curtain 218 may be a double curtain that includes a full curtain hanging past the edge of pan 102 on the outside of apparatus 100 and a smaller curtain (e.g., half curtain) hanging directly behind the position of the saw (e.g., saw 400 shown as dashed lines in FIG. 1). The full curtain of curtain 218 may hang above tray 110 and/or contact a top of tray 110. In some embodiments, curtain 216 may include hole 217, as shown in FIG. 5. Hole 217 may be, for example, a 2" hole or another hole sized to allow electrical and/or other connections to saw 400 through curtain 216.

Curtain 220 may be attached to and hang from slide 214 and/or top shield extension 206 (e.g., using a rod or other attachment). Curtain 220 may hang below an edge of tray 106. Curtain 220 may provide containment underneath top shield extension 206 and above the back portion of tray 106. In some embodiments, curtain 220 may hang above and contact a top of tray 106.

Curtain 222 may be attached to and hang from an edge of top shield extension 206 (e.g., using a rod or other attachment). Curtain 222 may hang down such that the curtain remains above a portion of tray 106 to prevent debris and/or fluid from escaping past the edge of tray 106. In some embodiments, curtain 222 may hang down and contact a top of tray 106.

In certain embodiments, apparatus 100 includes curtain 224, shown in FIG. 2. Curtain 224 may be attached to a bottom surface of fixed hood shield 204 using a curtain rod or other attachment. Curtain 224 may provide protection against moisture and/or dust entering a motor of saw when the saw is positioned in apparatus 100 (e.g., saw 400, as positioned in FIG. 1).

In certain embodiments, curtains 216, 218, 220, and 222 have at least some overlap in the horizontal direction to reduce the potential for gaps in containment of debris, dust, and/or fluid inside apparatus 100. The combination of curtains 216, 218, 220, 222, and 224 may form a three-sided containment/protection shield hanging from hood apparatus 202 to prevent unnecessary spraying of debris, dust, and/or fluid. Curtains 216, 218, 220, 222, and 224 may be used in combination with hood shields 204 and 206 to provide a containment of debris, dust, and/or fluid in apparatus 100. For example, curtains 216, 218, 220, and 222 may prevent outward spraying of debris, dust, and/or fluid while hood shields 204 and 206 may prevent upward spraying of debris, dust, and/or fluid.

During operation of apparatus 100 (e.g., cutting of tile or other material using saw 400), the combination of the curtains and hood shields may contain sprayed debris, dust, and/or fluid along the back and sides of saw 400 while debris, dust, and/or fluid sprayed from the front of the saw (which tends to be less than is sprayed from the back or sides of the saw) may be collected in pan 102 and/or trays 104, 106, and 108. Thus, apparatus 100 provides a containment and collection system for debris, dust, and/or fluid emanating from saw 400 that allows little to no debris, dust, and/or fluid to escape the apparatus. Providing such containment and collection may allow apparatus 100 to be used at a finished location for material being cut with saw 400 (e.g., at the location of installation of tile being cut by the saw).

In certain embodiments, pan 102 is placed on a support structure. The support structure may be a frame or other rigid support structure with strength to support pan 102 and other components of apparatus 100 along with saw 400. In certain embodiments, frame 250 supports pan 102, as shown in FIGS. 1-5. Frame 250 may be a frame that pan 102 rests on or is coupled to. Frame 250 may be attached to legs 252. Legs 252 may, in some embodiments, be foldable legs (e.g., folded up against frame). Legs 252 may be secured in place using leg folding locks 254. Leg braces 256 may provide further support for legs 252 (e.g., to prevent collapsing or bending of the legs). In some embodiments, shelf 258 is placed between legs 252. Shelf 258 may, for example, be supported on or coupled to leg braces 256. Shelf 258 may be used for storage or placement of components used with apparatus 100 (e.g., a container 310 as described below).

Figure 6:
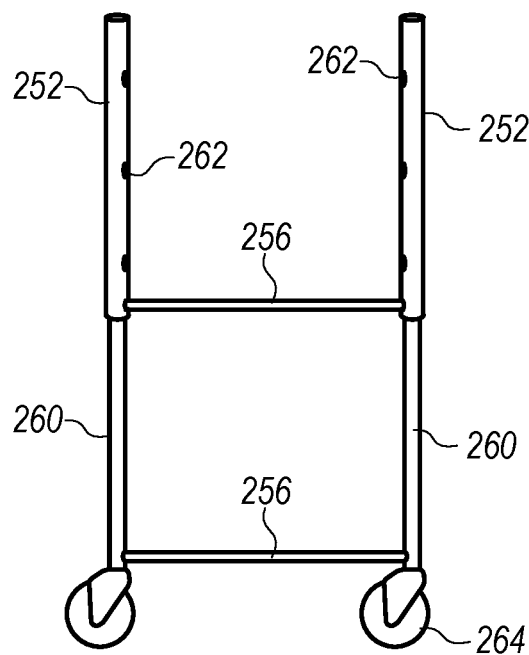
FIG. 6 depicts a side-view representation of an embodiment of a pair of legs.

In some embodiments, legs 252 are extendable. FIG. 6 depicts a side-view representation of an embodiment of a pair of legs 252. It should also be noted that apparatus 100 is shown with legs 252 extended using leg extensions 260 in the embodiment depicted in FIG. 2. As shown in FIG. 6, leg extensions 260 may be used to extend the height of legs 252. Leg extensions 260 may have separate legs braces 256 from the upper part of legs 252. The upper parts of legs 252 may include extension leg locks 262 that lock leg extensions 260 in place when extended to a desired length. Extension leg locks 262 may be, for example, button holes in legs 252 that spring-loaded buttons insert into to secure leg extensions 260 in place.

In certain embodiments, wheels 264 are coupled to the bottom of legs 252/leg extensions 260. Some of wheels 264 may be locking-type wheels that can be locked to prevent unwanted movement when apparatus 100 is positioned for use. For example, the front wheels 264 may be locking wheels.

In certain embodiments, apparatus 100 includes filter apparatus 300, as shown in FIGS. 2 and 3. Filter apparatus 300 may include pot 302 coupled to the bottom of pan 102. Pot 302 may be coupled to pan 102 with lid 303, as shown in FIG. 3. Pot 302 may be coupled to pan 102 under drain 105, as shown in FIG. 2. In some embodiments, plug 304 is placed in drain 105. Plug 304 may be used to close off drain 105. During use of apparatus 100, plug 304 may be removed to allow fluids to enter pot 302.

Pot 302 may be a sand filter pot, or include a sand filter and/or a polishing pad, to remove particles (e.g., dust) from fluid entering the pot to clean the fluid of particles. Filtered fluid may drain from pot 302 through drain 306. Pot 302 may include a number of holes that allow fluid to enter drain 306. Drain 306 may be, for example, a ¾-inch garden hose MH drain. Drain 306 may be capped using cap 308 (e.g., for storage or transport of apparatus 100).

Figure 7:
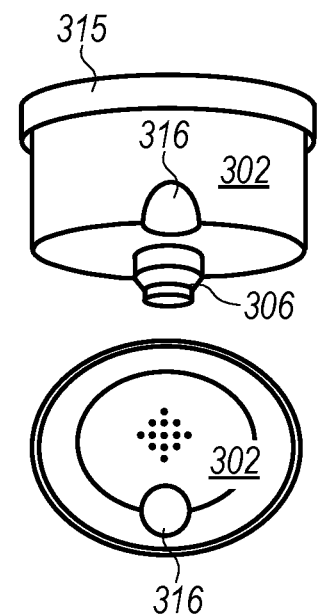
FIG. 7 depicts side and top views of a pot showing a channel.

In certain embodiments, filtered fluid may drain from pot 302 into container 310, as shown in FIG. 2. Container 310 may be a standard catch bucket or another water holding container. Fluid may be pumped from container 310 using pump 312 and pump line 314 (shown with dashed lines in FIG. 2). In some embodiments, pot 302 includes channel 316. FIG. 7 depicts side and top views of pot 302 showing channel 316. Channel 316 may allow pump line 314 and/or an electrical line to enter container 310 when the container is coupled to the bottom of pot 302, as shown in FIG. 2. In some embodiments, pot 302 may be used without attaching the pot to pan 102 by placing the pot on top of container 310, which is placed on top of shelf 258. In some embodiments, polishing pad 315 may be coupled to the top of pot 302.

In some embodiments, fluid drained into container 310 may be recycled or reused in apparatus 100. The slow drainage in trays 104, 106, 108, and 110 and the slow drainage in pan 102 may be combined with the filtration in pot 302 to provide fluid that is suitable for reuse in apparatus 100. For example, fluid drained into container 310 may be pumped from the container to be used as coolant/fluid with saw 400 (e.g., used as wet saw fluid). Apparatus 100 may produce cleaner reused fluid (e.g., water) in container 310 and at saw 400 than conventional containment systems. The cleaner fluid may reduce heating of a blade in saw 400 (e.g., a diamond blade), which may allow the blade to cut faster and produce higher tile cutting throughput using apparatus 100. Additionally, using cleaner fluid may increase a lifetime of the blade, reduce the likelihood of clogging saw port holes, and/or reduce the likelihood of pump 312 freezing.

FIG. 8 depicts an upper front perspective view representation of an embodiment of containment apparatus 100 in an expanded position for use in operating saw 400. FIG. 8 depicts an embodiment similar to the embodiment depicted in FIG. 1 with flat trays 126 and 128 placed in position on frame 103 and saw 400 in position on the flat trays. As described herein and shown in FIG. 8, apparatus 100 provides containment and collection of debris, dust, and/or fluid associated with the use of saw 400 in cutting materials (e.g., tile). The containment and collection provided by apparatus 100 allows the apparatus to be operated at a finished location (e.g., at the work site or site of installation of tiles), which may increase productivity at the work site.

Apparatus 100 may also allow for cutting of different sized materials (e.g., different sized tiles). For example, trays 104 and/or 110 may be extended to accommodate longer tiles and/or tray 106 may be extended to accommodate for wider tiles. In some embodiments, one or more of the trays may be used to place scrap cutting materials. For example, scrap portions of cut tiles may be placed in tray 104, tray 108, and/or attachment plate 124. One or more of the trays may also be used to place cut tiles for drying. For example, cut tiles may be placed upright in tray 104 and/or tray 108 for drying before installation of the tile. Cut tiles may be leaned up against hood arm brace 208 or another structure for drying in the trays. Placing cut tiles for drying in the trays may allow dripped fluid from the tiles to be drained into pan 102 and recycled and/or reused by apparatus 100.

For transport or storage, apparatus 100 may be compacted or collapsed, as shown in FIG. 5. When compacted, apparatus 100 may be transported inside buildings or through doorways before being expanded to its full expanded position, shown in FIGS. 1 and 8. For example, apparatus 100, when compacted, may be transportable in a space that has room for 43"×22"×22" (length×width×height) such as a cargo area of a vehicle. Apparatus 100, when compacted, may fit through doorways typical of a tile installation site (e.g., 2/0 door casings).

As described above, when apparatus 100 is expanded for use at a work site, as shown in FIG. 8, the adjustability of extension of trays 106 and 110 allows for adjustment to different sizes of materials (e.g., tiles) to be cut. For example, apparatus 100 may be used for different sized tiles that span from 24" on a diagonal to 10"×48" lengths.

The following is provided as a non-limiting example of a use situation of apparatus 100:

A tile installer may transport a collapsed version of apparatus 100, with legs 252 folded up, in a vehicle along with tiles to a job site. The installer may unload apparatus 100 from the vehicle and extend legs 252. The installer may move apparatus 100 to the work site using wheels 264. At the work site, the installer may expand apparatus 100 (including the trays and/or hood extension) as needed and begin cutting tiles. During operation, apparatus 100 may prevent debris, dust, and/or fluid from escaping the apparatus (e.g., from being sprayed or flowing outside the apparatus) and may allow gravity to filter debris, dust, and/or fluid from the cuttings into pot 302 and/or container 310 without clogging the filter in the pot. This filtering takes place continuously during the operation of saw 400. Utilizing gravity drainage in the trays and pan instead of a pump placed near the saw (e.g., a pump placed in a basin under the saw), the removal of the debris, dust, and/or fluid occurs at a slow pace that makes the removal of the debris, dust, and/or fluid more efficient. Debris and/or dust that remains in the trays or pan after draining of the fluid may be readily cleaned from the trays or pan.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. An apparatus for supporting a saw, comprising:
a pan comprising at least four sides and a drain in a bottom of the pan;
a frame positioned on the pan;
a first tray coupled to a first side of the pan, wherein the first tray is capable of being moved in and out from the first side of the pan;
a second tray coupled to a second side of the pan, wherein the second tray is capable of being moved in and out from the second side of the pan;
a third tray coupled to a third side of the pan, wherein the third tray is capable of being moved in and out from the third side of the pan;
a fourth tray coupled to a fourth side of the pan, wherein the fourth tray is capable of being moved in and out from the fourth side of the pan;
at least one flat tray positioned on the frame, wherein the at least one flat tray is configured to support a saw; and
a hood apparatus coupled to the frame, wherein the hood apparatus is positioned at least partially above a position of the saw when the saw is placed on the at least one flat tray, and wherein the hood apparatus comprises:
a hood arm brace attached to the frame;
a hood frame attached to the hood arm brace;
a fixed top shield coupled to the hood frame;
a top shield extension coupled to the fixed top shield, wherein the top shield extension is capable of being moved in and out from an end of the fixed top shield; and
a plurality of curtains coupled to the fixed top shield and the top shield extension, wherein the curtains hang downwards from the fixed top shield and the top shield extension on at least three sides of the hood apparatus.

2. The apparatus of claim 1, wherein the bottom of the pan comprises at least some slope downwards towards the drain.

3. The apparatus of claim 1, wherein the bottom of the pan comprises a slope downwards of about ⅛" per foot towards the drain.

4. The apparatus of claim 1, wherein the bottom of the pan comprises a ¼" change downwards in height for a distance of 2" from each corner of the pan.

5. The apparatus of claim 1, wherein the first tray, the second tray, the third tray, and the fourth tray comprise at least some slope downwards towards the pan.

6. The apparatus of claim 5, wherein the first tray, the second tray, the third tray, and the fourth tray comprise a slope downwards of about ½" per foot towards the pan.

7. The apparatus of claim 1, wherein the pan comprises:
a first slot on the first side of the pan wherein the first tray moves in and out of the first slot;
a second slot on the second side of the pan, wherein the second tray moves in and out of the second slot;
a third slot on the third side of the pan, wherein the third tray moves in and out of the third slot; and
a fourth slot on the fourth side of the pan, wherein the fourth tray moves in and out of the fourth slot.

8. The apparatus of claim 1, wherein the first tray, the second tray, the third tray, and the fourth tray comprise raised edges.

9. The apparatus of claim 1, wherein the curtains at least partially surround at least three sides of the position of the saw when the saw is placed on the at least one flat tray.

10. The apparatus of claim 1, wherein the curtains at least partially overlap in the horizontal direction.

11. The apparatus of claim 1, wherein the curtains at least partially contact at least one of the trays.

12. The apparatus of claim 1, further comprising a filter coupled to the drain of the pan.

13. The apparatus of claim 12, further comprising a container coupled to the filter for collecting fluids drained through the filter.

14. The apparatus of claim 13, further comprising a pump placed in the container, wherein the pump is configured to provide fluids collected in the container to the position of the saw in the apparatus.

15. The apparatus of claim 1, wherein the at least one flat tray is positioned on the frame such that there is at least some gap between at least one edge of the at least one flat tray and at least one side of the pan.

16. An apparatus for supporting a saw, comprising:
a pan comprising at least four sides and a drain in a bottom of the pan;
a frame positioned on the pan;
a first tray coupled to a first side of the pan, wherein the first tray is capable of being stored in the pan and extended from the first side of the pan;
a second tray coupled to a second side of the pan, wherein the second tray is capable of being stored in the pan and extended from the second side of the pan;
a third tray coupled to a third side of the pan, wherein the third tray is capable of being stored in the pan and extended from the third side of the pan;
a fourth tray coupled to a fourth side of the pan, wherein the fourth tray is capable of being stored in the pan and extended from the fourth side of the pan;

at least one flat tray positioned on the frame, wherein the at least one flat tray is configured to support a saw placed in the apparatus; and a hood apparatus coupled to the frame, wherein the hood apparatus is positioned above a position of the saw when the saw is placed on the at least one flat tray, and wherein the hood apparatus comprises:

a top shield;

a top shield extension coupled to the top shield, wherein the top shield extension is capable of being stored in the top shield and extended from an end of the top shield; and a plurality of curtains coupled to the top shield and the top shield extension, wherein the curtains hang downwards from the top shield and the top shield extension on at least three sides of the position of the saw when the saw is placed on the at least one flat tray.

17. The apparatus of claim 16, wherein at least one of the trays is configured to be extended a distance from the pan selected based on a size of a material being cut using the saw when the saw is positioned in the apparatus.

18. The apparatus of claim 16, further comprising a support frame, wherein the pan is positioned on and supported by the support frame.

19. The apparatus of claim 18, further comprising one or more wheels coupled to the support frame, wherein at least one wheel comprises a wheel lock mechanism.

20. The apparatus of claim 16, wherein the apparatus is capable of being moved through a 2/0 door frame when the trays are stored in the pan and the top shield extension is stored in the top shield.

* * * * *